United States Patent Office 2,795,611
Patented June 11, 1957

2,795,611

PROCESS FOR THE PRODUCTION OF HYDROXYLAMINES

Hildegard List, née Biedermann, Berlin-Zehlendorf, Germany, assignor, by mesne assignments, to Hercules Powder Company, Wilmington, Del., a corporation of Delaware No Drawing. Application February 10, 1954,
Serial No. 409,537

Claims priority, application Germany March 18, 1953

6 Claims. (Cl. 260—563)

This invention relates to the preparation of hydroxylamines and, more particularly, to an improved process for oxidizing amines with hydrogen peroxide to the corresponding hydroxylamine.

The synthesis of hydroxylamines can be carried out in different ways as, for example, by the reduction of nitro compounds, or by the hydrogenation of phenols or cresols in the presence of a hydroxylamine salt (for the preparation of cyclic hydroxylamines), or by the oxidation of an amine with oxidizing agents, such as monoperoxysulfuric acid. However, the last-mentioned reaction, which should be advantageous per se, is very difficult. Up to now it was successful only when the amino group is bound to a tertiarily bound carbon atom. (Bamberger and Seligmann, Ber. 36, 685 (1903).) Moreover, difficulties arise in the isolation, since an impure reaction product is obtained, which reduce the hydroxylamine yield.

It has now been found that it is easily possible to convert primary amines also at a primarily or secondarily bound carbon atom as well as at a tertiarily bound carbon atom into hydroxylamine, when the oxidation is carried out at very low temperatures by means of hydrogen peroxide as oxidizing agent in the presence of, as a catalyst, a salt of molybdic, tungstic, or uranic acid and preferably with the addition of small amounts of, as a stabilizer, a salt of ethylenediaminetetraacetic acid or nitrilotriacetic acid.

Since the hydroxylamines are not the final stages of the oxidation, it is important that the reaction is carried out very carefully since otherwise higher oxidation products would form. Above all, it is necessary to maintain lower temperatures, whereby at first amine-hydroperoxide compounds are obtained. (Ind. Eng. 39, 1536 (1947).)

The stability of these compounds is increased considerably by small additions of the salts of ethylenediaminetetraacetic acid or of nitrilotriacetic acid. The amine-hydroperoxide compounds mentioned above decompose then slowly in the presence of the catalyst with formation of the hydroxylamine compound. To avoid the formation of higher oxidation products, such as oximes or ketones, the heat formed during the reaction must be removed by intense cooling of the reaction solution so that, especially at the beginning, the temperature of the reaction liquid definitely does not rise appreciably above 0° C.

For the preparation of pure hydroxylamine compounds, the small amounts of raw material contained in the precipitate can be removed by washing.

The following examples are illustrative of the preparation of hydroxylamines from amines in accordance with this invention.

*Example 1*

One hundred parts of cyclohexylamine, 3 parts of sodium ethylenediaminetetraacetate, and 150 parts of water are cooled with stirring to about —5° C. One hundred parts of hydrogen peroxide (34%) is added to the reaction solution. A thick crystal paste of cyclohexylamine-hydroperoxide is formed. Thereby the temperature rises to about 15° C. The reaction temperature must be lowered again to —5° C. by cooling.

The catalyst solution consists of 4 parts of cyclohexylamine, 5 parts of tungstic acid, and 300 parts of water. It is added in portions to the cyclohexylamine-hydroperoxide compound so that the temperature does not exceed —4° C.

The stirring of the reaction mixture is continued for 2 hours at this temperature. By omitting the external cooling, the temperature of the solution rises very gradually to +5° C. within about 1 hour. The reaction is completed when the hydrogen peroxide reaction is negative.

The cyclohexylhydroxylamine is separated from the residual reaction solution by filtration and purified further by intensive washing.

About 115 parts of a crystal cake with about 40% water is obtained. This corresponds to a yield of about 70% cyclohexylhydroxylamine referred to the cyclohexylamine used. The melting point of the anhydrous substance is 135° C.

*Example 2*

One hundred seven parts of benzylamine, 6 parts of sodium ethylenediaminetetraacetate, 7 parts of sodium sulfate, and 200 parts of water are cooled to —5° C. Upon addition of 100 parts of hydrogen peroxide (34%), an oil separates, but the temperature does not rise noticeably. The catalyst solution consists of 5 parts of tungstic acid, 4 parts of benzylamine, and 300 parts of water. It is added to the reaction solution in portions in such a way that the temperature does not exceed —4° C. The reaction is completed after about 5 hours, i. e., hydrogen peroxide can no longer be detected in the reaction solution. The benzylhydroxylamine is obtained in the form of shiny white leaflets and is separated by filtration from the reaction solution. About 100 parts of benzylhydroxylamine with a water content of about 35% are obtained. This corresponds to a yield of about 60% benzylhydroxylamine, referred to the benzylamine used. The melting point of the anhydrous substances is 55° C.

What is claimed and desired to protect by Letters Patent is:

1. The process of preparing an organic hydroxylamine compound which comprises oxidizing a primary amine of the group consisting of cyclohexylamine and benzylamine with hydrogen peroxide in the presence of a catalyst and a stabilizer, the catalyst being a salt obtained by dissolving an acid of the group consisting of tungstic, molybdic, and uranic in an aqueous solution of the amine, the stabilizer being an alkali metal salt of an acid of the group consisting of nitrilotriacetate acid and ethylenediaminetetraacetic acid, and maintaining the temperature of the oxidation reaction below about 0° C. during the addition of said catalyst.

2. The process of claim 1 wherein the oxidation reaction is carried out as a continuous process.

3. The process of preparing an organic hydroxylamine compound which comprises oxidizing cyclohexylamine with hydrogen peroxide in the presence of a catalyst and a stabilizer, the catalyst being a salt obtained by dissolving tungstic acid in an aqueous solution of the cyclohexylamine, the stabilizer being sodium ethylenediaminetetraacetate, and maintaining the temperature of the oxidation reaction below about 0° C. during the addition of said catalyst.

4. The process of claim 3 wherein the oxidation reaction is carried out as a continuous process.

5. The process of preparing an organic hydroxylamine compound which comprises oxidizing benzylamine with hydrogen peroxide in the presence of a catalyst and a stabilizer, the catalyst being a salt obtained by dissolving tungstic acid in an aqueous solution of the benzylamine, the stabilizer being sodium ethylenediaminetetraacetate, and maintaining the temperature of the oxidation reaction below about 0° C. during the addition of said catalyst.

6. The process of claim 5 wherein the oxidation reaction is carried out as a continuous process.

References Cited in the file of this patent

UNITED STATES PATENTS 2,718,528  Pieper _____ Sept. 20, 1955